United States Patent [19]

Evels et al.

[11] Patent Number: 5,518,157
[45] Date of Patent: May 21, 1996

[54] CUT OFF EXTRUDED SUPPORT FOOT FOR THE END OF A RAILING TUBE ON THE ROOF OF A MOTOR VEHICLE

[75] Inventors: Brigitte Evels; Karl-Heinz Lumpe, both of Wuppertal, Germany

[73] Assignee: Happich Fahrzeug-Dachsysteme GmbH, Germany

[21] Appl. No.: 301,693

[22] Filed: Sep. 7, 1994

[30] Foreign Application Priority Data

Sep. 24, 1993 [DE] Germany .......................... 43 32 524.6

[51] Int. Cl.$^6$ ................................. B60R 9/00; B60R 9/04
[52] U.S. Cl. ................................. 224/309.000; 224/310; 224/322; 224/325; 224/326; 224/327
[58] Field of Search ................................. 224/309, 310, 224/321, 322, 323, 324, 326, 327, 328

[56] References Cited

U.S. PATENT DOCUMENTS 3,853,254  12/1974  Helm ....................... 224/321
4,175,682  11/1979  Bott ........................ 224/309
4,279,368   7/1981  Kowalski .................. 224/309
4,341,332   7/1982  Kowalski et al. .......... 224/309

FOREIGN PATENT DOCUMENTS 8231689  3/1983  Germany .
3230346  2/1984  Germany .

*Primary Examiner*—Henry J. Recla
*Assistant Examiner*—Timothy L. Maust
*Attorney, Agent, or Firm*—Ostrolenk, Faber, Gerb & Soffen

[57] ABSTRACT

A support foot for supporting the end of a railing tube on the roof of a motor vehicle. The foot is fastened on the roof of the vehicle and rests on a resting surface. An insertion pin is vertically and laterally spaced from the resting surface and produces a plug connection with the railing tube. At least one opening extending transversely though the foot. Cover plates cover both sides of the foot and at least one opening which passes through the foot. The support foot is a section cut off from an extruded profiled strip cut transverse to the longitudinal axis thereof.

19 Claims, 2 Drawing Sheets

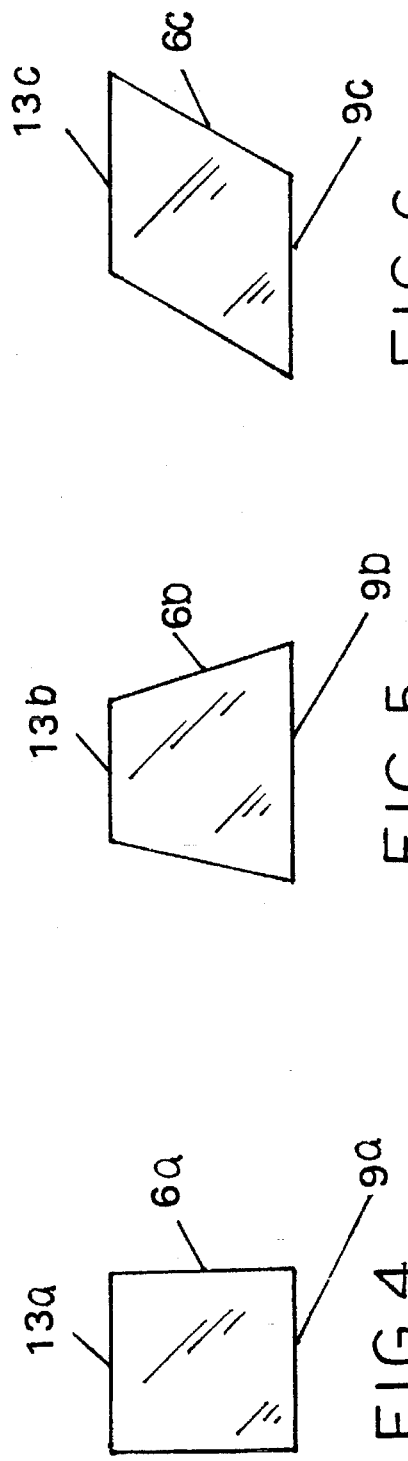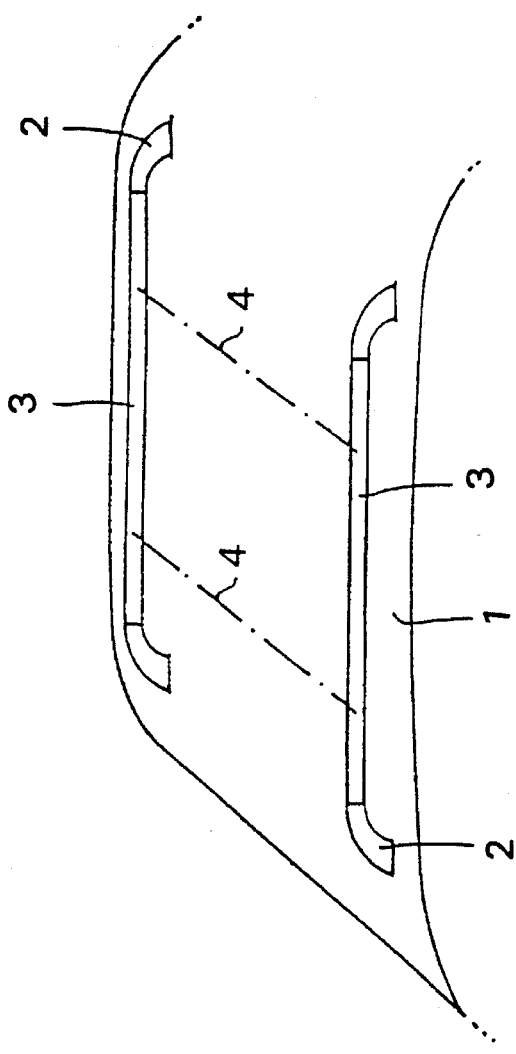

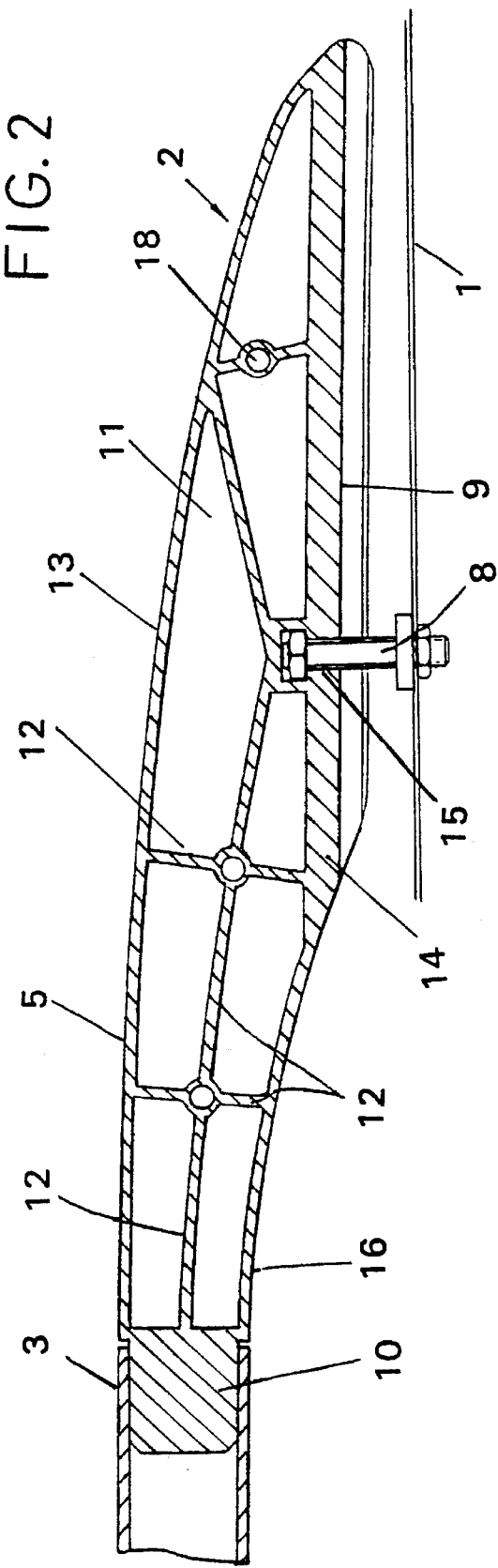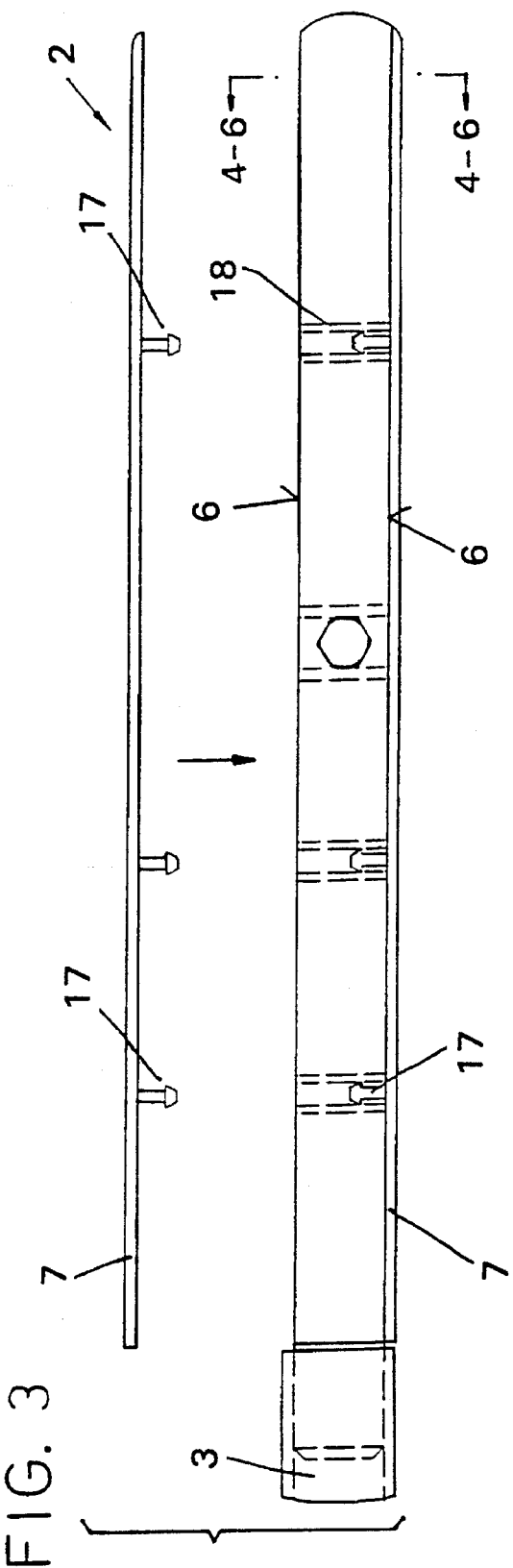

CUT OFF EXTRUDED SUPPORT FOOT FOR THE END OF A RAILING TUBE ON THE ROOF OF A MOTOR VEHICLE

BACKGROUND OF THE INVENTION

The present invention relates to a support foot for supporting the end of a railing tube on the roof of a motor vehicle. The foot has fastening means for fastening on the roof of the vehicle, a resting surface on the roof, an insertion pin which is vertically and laterally spaced from the resting surface for providing a plug connection with the railing tube, at least one opening extending transversely through the tube, and cover plates which cover both sides of the at least one opening.

Railing tubes of a roof railing are customarily supported on the roof of a motor vehicle by support feet arranged at the ends of the tubes. The support feet are generally developed as solid metal bodies in the form of chill castings or die castings. Furthermore, German Utility Model 82 31 689, from which the present invention proceeds, discloses developing such support feet as light metal forgings. All known support feet have the disadvantage that they are expensive to manufacture and require work intensive subsequent machining since they must be ground to the correct size and shape, which is generally done by hand.

SUMMARY OF THE INVENTION

The object of the present invention is, therefore, to provide a support foot of the aforementioned type which is particularly simple and inexpensive to manufacture and whose visible sides do not require additional work, such as smoothing, or the like.

This object is achieved with the invention where the support foot consists of a section which is cut off from an extruded profiled strip with the cuts transverse to the longitudinal axis of the strip.

For producing a support foot or a plurality of the feet, a long profiled strip is extruded. Slices are cut off the profiled strip across the axis of extrusion for forming support feet. After the feet have been provided with cover plates over their cut open sides, they are ready for installation without requiring expensive additional working. The cross section of an extruded profiled strip can be shaped in accordance with customer wishes so that the support foot of the invention also satisfies aesthetic desires, in addition to its extremely favorable cost of manufacture.

For vehicles having a roof surface which extends substantially horizontally, the section has cut surfaces or wide sides which extend perpendicular to the roof resting surface. On the other hand, if the roof surface is curved to a greater or lesser extent, or if it is desired that the support feet of a roof rail be inclined with respect to each other, the section should have cut surfaces or wide sides which extend obliquely to the resting surface. In general, however, the cut surfaces or wide sides should extend parallel to each other, although it is, of course, possible to arrange the cut surfaces in such a manner that an enlarged resting surface results. In that case, waste must be tolerated.

In another development of the invention, the support foot consists of aluminum or an aluminum alloy. In this case, fundamentally the same material as is used to form the railing tubes also can, in principle, be used for manufacturing the support foot, with the advantage that there need be no difference between the support foot and the railing tube with respect to their degree of luster, fastness of color, and the like.

The extruded foot is hollow inside as the profile from which it is cut is hollow. The cut sides are therefore joined by at least one opening across the foot. In order to obtain adequate strength of the foot, in a further development of the invention, the at least one opening extending across the foot may be subdivided by ribbing into several openings. This measure saves material and weight and permits small wall thicknesses of the walls surrounding the opening and defining the foot.

The resting surface of the support foot is developed on a wall of the foot which separates the resting surface from the at least one opening. The wall has an opening for receiving fastening means. That opening can be developed as a threaded hole which passes through the wall. Fastening means developed as a threaded bolt can be screwed into the threaded hole. A threaded nut is screwed onto the other end of the bolt from inside the vehicle to hold the foot bolted in place. The fastening means opening can also be developed as a slot which extends through the wall of the foot and through which a threaded bolt passes which is then fastened to the body of the vehicle in order to secure the support foot on the roof of the vehicle by a threaded nut. This securement enables relatively easy removal, which may be desired, for instance, for purposes of repainting.

A particularly long life of the support foot on the roof of the vehicle can easily be obtained by providing the resting surface of the support foot with a milling which is parallel to the roof.

Other features and advantages of the present invention will become apparent from the following description of the invention which refers to the accompanying drawings.

BRIEF DESCRIPTION OF THE DRAWINGS

One embodiment of the invention will be explained in further detail below with reference to the drawing, in which:

FIG. 1 shows roof railing tubes supported by support feet, and arranged on the roof of a vehicle;

FIG. 2 shows one of the support feet of FIG. 1 in side view and without cover plates;

FIG. 3 is a partially exploded view of the support foot of FIG. 2 in top view and with cover plates; and FIGS. 4–6 show various cross sections of the body of the support foot at 4–6 in FIG. 3, illustrating shapes and inclines of the sides of the foot.

DETAILED DESCRIPTION OF A PREFERRED EMBODIMENT

FIG. 1 shows the roof plate 1 of motor vehicle (not further shown) with a roof luggage carrier arranged thereon. The roof luggage carrier includes two parallel rails. Each rail is comprised of two spaced apart support feet 2 and a railing tube 3 between each pair of feet, and of transverse supports 4, indicated in dash-dot line, which are fastened between the railing tubes 3. The railing tubes extend at least approximately parallel to each other in the longitudinal direction of the vehicle.

The support foot 2 shown in FIGS. 2 and 3 is comprised of the bearing metal body part 5 and two cover plates 7 fastened onto opposite sides of the body to cover the wide sides 6. The support foot 2 can be fastened, in a manner not shown in detail, to the roof of the vehicle by fastening means, e.g. a threaded bolt 8. The support foot is formed from a section which has been cut from an extruded profiled strip (not shown) which is cut transversely to the longitudinal axis of the extruded strip. The axis of the extruded strip is perpendicular to the longitudinal axis of the foot 2, i.e. into the drawing sheet. The cross section of the profiled strip corresponds, for instance, to the shape of the body part 5 shown in FIG. 2. The support foot 2 includes a bottom resting surface 9 at one end, which rests on the roof plate 1. There is an insertion pin 10 at the opposite end of the foot which is vertically and laterally spaced from the resting surface and which produces a plug connection with the railing tube 3. The profiled strip was essentially hollow within its exterior producing thereby at least one opening 11 that extends transversely through the foot between the lateral sides of the foot. Cover plates 7 cover both ends of the at least one opening 11 and both sides of the foot. In the embodiment shown in FIG. 2, the opening 11 is divided by ribbing 12 into several smaller cross section transverse openings. The strengthening ribbing 12 enables the top wall 13 and the bottom wall 14 of the foot to be kept relatively thin without loss of stability. The support foot 2 may be comprised of aluminum or an aluminum alloy, with the exception of the cover plates 7, and those plates may suitably be formed of plastic injection moldings.

In FIGS. 4-6, respectively the same elements are shown, but inclined or shaped differently. Therefore, suffixes a, b and c, respectively are applied to reference numbers in FIGS. 4, 5 and 6 the cut off surfaces or wide sides 6 of the support foot 2 can be parallel to each other and perpendicular to the resting surface, as suggested in FIGS. 3 and 4, or can be canted with respect to each other depending on the desired foot profile as in FIG. 5, and they can extend either perpendicularly, as in FIG. 4, or obliquely, as in FIG. 6, to the resting surface 9. The resting surface 9 can usually remain unmachined. But, in certain installations, that surface may also be milled parallel to the roof.

The bottom wall 14 of the foot has a passage opening 15 which may be developed, optionally, as a threaded hole or as a slot. The top wall 13 as well as the connecting wall 16 between the bottom wall 14 and the insertion pin 10 pass flush into the railing tube 3. On the other hand, the wide sides 6 of the support foot 2 are set back stepwise with respect to the railing tube 3. The cover plates 7 which are inserted in those set back regions are adapted in thickness to the depression of those regions so that there is a smooth surface transition also between the cover plates 7 and the railing tube 3.

The cover plates 7 have fastening means 17 developed on their rear or inward sides which are received in the corresponding narrow openings 18 in the ribbing, as seen in the drawings. Alternatively, the opposite fastening means can engage with each other, as in German Utility Model 82 31 689, or else they optionally can be engaged by clipping on the body part 5.

The measure that a lengthwise strip-shaped extruded body is cut into individual pieces of slight axial length which can be used as practically finished support feet is important in connection with the new support foot.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A support foot for a railing tube of a roof railing of a motor vehicle, the support foot including a one piece body of continuous cross section which is formed by milling a section cut from an extruded profiled strip transversely to the longitudinal axis of the strip, the section having a longitudinal axis parallel to the axis of the railing to which the foot is adapted to be connected, the cut body having opposite parallel lateral sides which are each defined by the cuts through the profiled strip and each of the lateral sides being flat and uncurved along the longitudinal axis of the foot;

the body having a resting surface on one end thereof which joins the lateral sides and is adapted to rest on the roof of the vehicle and connection means on an opposite end thereof for connecting the body to the railing tube;

the body being shaped as to have at least one opening extending transversely through it and between the lateral sides; and a cover plate mounted on each lateral side and covering at least the one opening in the support foot.

2. The support foot of claim 1, wherein the connection means is adapted for connection with the end of the railing tube.

3. The support foot of claim 2, wherein the body has an end away from the resting surface; the connection means comprising an insertion pin at the end of the foot away from the resting surface and shaped for producing a plug connection with the railing tube.

4. The support foot of claim 1 wherein the lateral sides of the body are oriented to extend perpendicular to the resting surface.

5. The support foot of claim 4, wherein the lateral sides of the body are oriented to extend parallel to each other.

6. The support foot of claim 1, wherein the lateral sides of the body are oriented to extend oblique to the resting surface.

7. The support foot of claim 6, wherein the lateral sides of the body are oriented to extend parallel to each other.

8. The support foot of claim 1, wherein the lateral sides of the body are oriented to extend parallel to each other.

9. The support foot of claim 1, wherein the body of the foot is of aluminum or an alloy thereof.

10. The support foot of claim 9, wherein the cover plates are comprised of plastic material.

11. The support foot of claim 1, further comprising ribbing in the body for dividing the at least one opening into several smaller cross section openings.

12. The support foot of claim 11, wherein the connection means are in part defined on the ribbing, and the connection means on the cover plates are received in the connection means on the ribbing.

13. The support foot of claim 1, wherein the body has a bottom wall in which the resting surface is developed, and the bottom wall separates the resting surface from the at least one opening.

14. The support foot of claim 13, further comprising an opening in the bottom wall of the body for receiving fastening means for fastening the body to the roof of a vehicle.

15. The support foot of claim 14, wherein the opening through the bottom wall comprises a threaded hole.

16. The support foot of claim 15, wherein the opening which extends through the bottom wall is developed as a slot.

17. The support foot of claim 1, wherein the resting surface of the body is milled with a milling thereof making it generally parallel to the roof surface on which the resting surface is disposed.

18. A support foot for a railing tube of a roof railing of a motor vehicle, the support foot including a one-piece body of continuous cross section, the body having opposite parallel lateral sides which are flat and uncurved along the longitudinal axis of the foot;

the body having a resting surface on one end thereof which joins the lateral sides and is adapted to rest on the roof of a vehicle and connection means on an opposite end thereof for connecting the body to the railing tube;

the body being shaped as to have at least one opening extending transversely through it and between the lateral sides; and a cover plate mounted on each lateral side and covering at least the one opening in the support foot.

19. A method for producing a support foot for a railing tube of a roof railing of a motor vehicle comprising providing an extruded profiled strip having a longitudinal axis of extrusion and having at least one opening extending through the strip along the longitudinal axis of the profiled strip transversely; cutting the strip at two locations spaced apart along longitudinal the axis of extrusion of the strip for defining the foot between the cuts and forming the cuts so as to produce opposite parallel lateral sides of the foot which are flat and uncurved;

mounting a cover plate on each lateral side of the body that has been cut from the strip for covering over the respective lateral side and the at least one opening in the support foot.

* * * * *